(12) United States Patent
Chen et al.

(10) Patent No.: US 9,812,937 B2
(45) Date of Patent: Nov. 7, 2017

(54) PERMANENT MAGNET LAMINATED MOTOR WITH AXIAL SPACER RING VENTS

(71) Applicant: Lehan Wei, Shanghai (CN)

(72) Inventors: Moquan Chen, Shanghai (CN); Bingyi Zhang, Shanghai (CN); Lehan Wei, Shanghai (CN)

(73) Assignee: Lehan Wei, Shanghai (CN)

( * ) Notice: Subject to any disclaimer, the term of this patent is extended or adjusted under 35 U.S.C. 154(b) by 370 days.

(21) Appl. No.: 14/425,952

(22) PCT Filed: Aug. 16, 2013

(86) PCT No.: PCT/CN2013/081635
§ 371 (c)(1),
(2) Date: Mar. 4, 2015

(87) PCT Pub. No.: WO2014/036883
PCT Pub. Date: Mar. 13, 2014

(65) Prior Publication Data
US 2015/0229193 A1    Aug. 13, 2015

(30) Foreign Application Priority Data

Sep. 4, 2012    (CN) .......................... 2012 1 0324131

(51) Int. Cl.
*H02K 16/00* (2006.01)
*H02K 21/24* (2006.01)
*H02K 1/27* (2006.01)

(52) U.S. Cl.
CPC ........... *H02K 16/00* (2013.01); *H02K 1/2793* (2013.01); *H02K 21/24* (2013.01)

(58) Field of Classification Search
CPC ....... H02K 16/00; H02K 1/2793; H02K 21/24
USPC ...... 310/114, 216.114, 216.079, 156.32, 268
See application file for complete search history.

(56) References Cited

FOREIGN PATENT DOCUMENTS

| CN | 1385635 A | * | 12/2002 | ........... H02K 49/102 |
|---|---|---|---|---|
| CN | 1012671147 A | | 9/2008 | |
| CN | 102801264 A | | 11/2012 | |
| CN | 202840876 U | | 3/2013 | |

(Continued)

OTHER PUBLICATIONS

Machine translation of JP 2012152019 A (Aug. 2012).*

(Continued)

*Primary Examiner* — Michael Andrews
(74) *Attorney, Agent, or Firm* — William H. Honaker; Dickinson Wright PLLC (57) ABSTRACT

A permanent magnet laminated motor includes two end plates (15,16) arranged in parallel; a rotating shaft (1) rotatably arranged between the two end plates (15,16); n+1 rotor units (11, 12, 13, 14) and n spacer rings (8, 9, 10) alternately fixedly sleeved on outer rims of the rotating shaft (1) and axially compacted; two magnetic conductive rings (6, 7) tightly sleeved at the outer rim of the rotating shaft (1) and tightly attached to the outer side of the outermost two rotor units (11, 14); and n stator units (37, 38, 39) respectively sleeved at the outer rims of the spacer rings (8, 9, 10). An axial air gap (40) is provided between each stator unit (37, 38, 39) and the adjacent rotor unit (11, 12, 13, 14), and the n stator units (37, 38, 39) are axially fixedly connected to the two end plates (15, 16) by installation screw rods (74, 75).

9 Claims, 8 Drawing Sheets (56) References Cited

FOREIGN PATENT DOCUMENTS

| JP | 2003348805 | A | * | 12/2003 | ............. | H02K 16/00 |
| JP | 2007143358 | A | * | 6/2007 | ............. | H10K 16/00 |
| JP | 2012152019 | A | * | 8/2012 | ............... | H02K 1/18 |

OTHER PUBLICATIONS

Machine translation of JP 2007143358 A (Jun. 2007).*
Machine translation of JP 2003348805 A (Dec. 2003).*
Machine translation of CN 1385635 A (Dec. 2002).*
International Search Report dated Nov. 7, 2013, Four (4) Pages.

* cited by examiner

PERMANENT MAGNET LAMINATED MOTOR WITH AXIAL SPACER RING VENTS

CROSS REFERENCE TO RELATED APPLICATION

This U.S. National Stage Patent Application claims the benefit of International Application Serial No. PCT/CN2013/081635 filed on Aug. 16, 2013 and CN Patent Application No. CN 201210324131.6 filed on Sep. 4, 2012, the entire disclosures of which are incorporated herein by reference.

BACKGROUND OF THE INVENTION

1. Field of the Invention

The present invention relates to a permanent magnet motor, particularly to a permanent magnet laminated motor with axial magnetic circuits.

2. Description of Related Art

Generally a generator is cartridge-shaped with its cylindrical rotor and cartridge-shaped stator being coaxial. For the convenience of output, the armature is always located outside as a stator. The specific power (power generated by unit weight of a motor) of this kind of generator is about 0.2 kw/kg, the specific power of the aviation generator could be up to 0.5 kw/kg.

However, in general the volume of current existing motor is very huge, which results in consuming large amounts of materials during the production, and the low utilization rate of silicon steel sheet makes it uneconomic. Such as the motor disclosed in the patent documents ZL871083191, ZL201110104458.8, from which the rotor magnets were adhered on both sides of the rotor disc to significantly increase the volume of the motor. And conventional stator windings are wrapped in the slot on the silicon steel sheet which reduces the utilization rate of silicon steel sheet.

In addition, as the rapidly development of industrial, higher requirements of motor specific power in many areas have been proposed; therefore, a new type of motor may be needed to meet these industrial requirements.

SUMMARY OF THE INVENTION

To solve the problems of the existing technology, the present invention aims to provide a permanent magnet laminated motor to reduce the weight and the volume of the motor, thus improve the specific power.

A permanent magnet laminated motor of the present invention, comprising:

a pair of end plates disposed in a parallel relationship to one another;

a rotating shaft rotatably disposed between said pair of end plates;

n+1 rotor units and n spacer rings fixably attached and sleeved orderly on the outer rim of said rotating shaft and axially compacted on said rotating shaft with said n+1 rotor units and said n spacer being alternating one another on said rotating shaft;

a pair of magnetic conductive rings sleeved on the outer rim of said rotating shaft and attached to the outer side of the outermost two of said n+1 rotor units respectively; and n stator units respectively sleeved on the outer rims of said spacer rings correspondingly and an axial air gap between each of said stator units and the adjacent rotor unit with said axial air gap being the same between each of said n stator units and the adjacent rotor unit and said n stator units being axially fixably attached to said pair of end plates by a plurality of installation screws;

wherein each of said n+1 rotor units includes:

a rotor disc defining 2p axial through-holes uniformly distributed in a pitch circle on an end plane of said rotor disc; and 2p magnets respectively embedded in said axial through-holes with the magnetizing directions of the 2p magnets being parallel to said rotating shaft and the polarities of said 2p magnets being arranged alternately along said pitch circle;

wherein the corresponding magnets among said n+1 rotor units are aligned to each other along the extension direction of said rotating shaft and the magnetic field lines of the aligned magnets have the same direction with n, p being natural numbers.

In the permanent magnet laminated motor mentioned above, each of said n stator units includes:

a stator frame including a pair of stator baseplates arranged in parallel and mirroring one other, and sleeved on the outer rims of said spacer rings;

2p cores clamped between said pair of stator baseplates and distributed evenly in said pitch circle; and coils wound around the outer rim of each of said cores.

In the permanent magnet laminated motor mentioned above, when taking n≥2, the positions of the 2p cores of each of said stator units are correspondingly staggered or aligned with the positions of the 2p cores of adjacent stator unit along axial direction.

In the permanent magnet laminated motor mentioned above, the surface of said stator baseplate is provided with 2p step holes which are distributed evenly in said pitch circle for inserting said cores wound by said coils.

In the permanent magnet laminated motor mentioned above, the outer rim of each of said cores is set to be a step surface, and the outer diameter at two ends of each of said cores is smaller than the outer diameter of a middle section of each of said cores and is matched with the smaller internal diameter of said step holes on said stator baseplate, and each of said coils is wound around the middle section of each of said cores, and the axial thickness of each of said coils is matched with the thickness of the middle section of each of said cores, and the outside diameter of each of said coils is matched with the larger inner diameter of said step holes on the stator baseplate.

In the permanent magnet laminated motor mentioned above wherein an end of said rotating shaft includes a backboard perpendicular to and integrated with said rotating shaft, and the outer rim of the other end of said rotating shaft including a screw thread, and said magnetic conductive rings, said n+1 rotor units, said spacer rings and said backboard are axially compacted into a whole by a locknut.

In the permanent magnet laminated motor mentioned above, a plurality of axial backboard vents being uniformly distributed on the same circumference of a circle on an end face of said backboard;

a plurality of axial rotor vents being uniformly distributed on the same circumference of a circle on an end face of said rotor disc;

a plurality of axial magnetic conductive ring vents being uniformly distributed on the same circumference of a circle on an end face of each of said magnetic conductive rings;

a plurality of axial spacer ring vents being uniformly distributed on the same circumference of a circle on an end face of each of said spacer rings, and a plurality of radial spacer ring vents interconnected with said axial spacer ring vents distributed on the outer rim of each of said spacer rings;

a plurality of axial end plate vents being uniformly distributed on an end face of the end plate.

In the permanent magnet laminated motor mentioned above wherein each of said pair of stator plate has a plurality of baseplate mounting holes distributed on the edge of said stator baseplate for receiving said installation screws, and in-frame washers glued between said pair of stator baseplates of each of said n stator units and concentric to said baseplate mounting holes.

In the permanent magnet laminated motor mentioned above wherein each of said end plate has a plurality of end plate mounting holes distributed on the edge of each of said end plates for receiving said installation screws, and a plurality of spacers disposed between each of said n stator units and each said end plates and concentric to said end plate mounting holes.

In the permanent magnet laminated motor mentioned above, when taking n≥2, said plurality of spacers is disposed between every two adjacent stator units sleeved on the outer rims of said installation screws.

In the permanent magnet laminated motor mentioned above, said magnets and said cores are of cylindrical shape, polygon prismatic shape, elliptic cylindrical shape or fan-shaped cylindrical shape.

By adopting the foregoing technical solutions, the motor of the present invention has far greater specific power than the common cartridge-type motor and disc motor, it also leads to motor weight loss and volume reduction which improve the utilization rate of silicon steel sheet and effectively minimize the consumption of structure materials. In addition, the self-cooling effect of this motor is better; especially making more sense by saving materials and reducing weight for large motor (especially for large wind power generator). Motor of the present invention is particularly suitable for transportations.

BRIEF DESCRIPTION OF THE DRAWINGS

FIG. 2 (a) is a front view of the structure of the rotor unit in the invention;

FIG. 2 (b) is an axial section view of the rotor unit in the invention;

FIG. 3 (a) is a front view of the structure of the stator baseplate in the invention;

FIG. 3 (b) is an axial section view of the stator baseplate in the invention;

FIG. 4 (a) is a front view of the structure of the stator unit in the invention;

FIG. 4 (b) is an axial section view of the stator unit in the invention;

FIG. 5 (a) is a front view of the structure of the core and coil in the invention;

FIG. 5 (b) is an axial section view of core and coil in the invention;

FIG. 6 (a) is a front view of the structure of the spacer ring in the invention;

FIG. 6 (b) is a bottom view of the structure of the spacer ring in the invention;

FIG. 6 (c) is a section view of the structure of the spacer ring in the invention perpendicular to axial direction;

FIG. 6 (d) is an axial section view of the spacer ring in the invention;

FIG. 7 (a) is a front view of the structure of the magnetic conductive ring in the invention;

FIG. 7 (b) is an axial section view of the magnetic conductive ring in the invention;

FIG. 8 (a) is a front view of the structure of the end plate in the invention;

FIG. 8 (b) is a section view taken along line A-A of FIG. 8 (a);

FIG. 8 (c) is a front view of the structure of the end plate in the invention which turned 90°;

FIG. 8 (d) is a section view taken along line B-B of FIG. 8 (c);

FIG. 9 (a) is a side view of the structure of the hollow rotating shaft in the invention;

FIG. 9 (b) is an axial section view of the hollow rotating shaft in the invention;

FIG. 10 (a)-(c) is diagrams showing staggered cores of each stator unit according to embodiment 1 of the invention, wherein FIG. 10 (a) shows the difference between the position of core on the first stator unit and the position of magnet of the rotor unit is set to 0°, FIG. 10 (b) shows the positions of all cores on the second stator unit turning 15° along the pitch circle, FIG. 10 (c) shows the positions of all cores on the third stator unit turning 30° along the pitch circle.

DETAILED DESCRIPTION OF THE PREFERRED EMBODIMENTS

Embodiments of the invention will be described in detailed with reference to accompanying drawings.

As FIG. 1-FIG. 10 shows, the invention, a permanent magnet laminated motor, comprising: two end plates 15,16 arranged in parallel; a rotating shaft 1 rotatably arranged between the two end plates 15,16 by two bearings 2,3; n+1 rotor units and n spacer rings alternately fixedly sleeved orderly on the outer rim of the rotating shaft 1; two magnetic conductive rings 6,7 tightly sleeved on the outer rim of the rotating shaft 1 and tightly attached to the outer side of the outermost two of the rotor units respectively; and n stator units respectively sleeved on the outer rims of the spacer rings correspondingly, wherein the same axial air gaps 40 is provided between each stator unit and the adjacent rotor unit, and the edges of stator units are axially fixedly connected to the two end plates 15,16 by several installation screws, n for natural number.

In this embodiment, taking n=3 (this is to make it consistent with conventional three-phase generator or three-phase motor), then the number of spacer rings and stator units is both 3, as shown in the attached figure as the spacer rings 8, 9, 10, and the stator units 37, 38, 39; accordingly, n+1=4, namely the number of rotor units is 4, as shown in the attached figure as rotor units 11, 12, 13, 14.

Then we make description on the components mentioned above in details.

Figure 9:
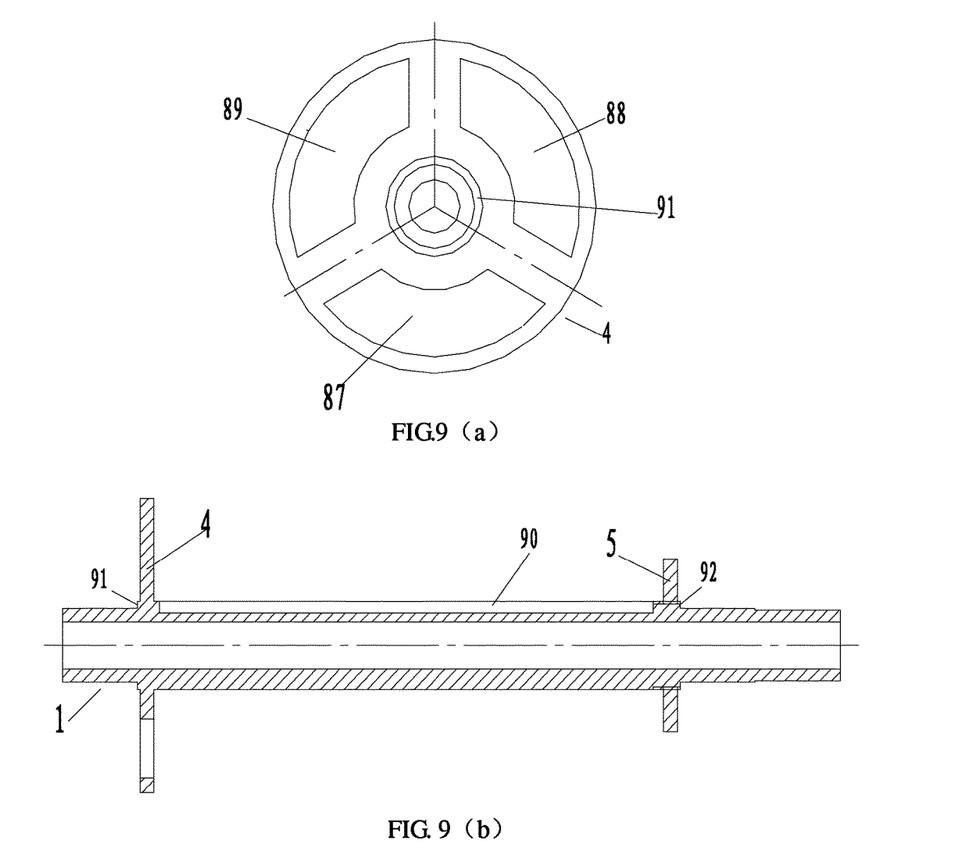

An end of the rotating shaft 1 is provided with an backboard 4 perpendicular to and integrated with the rotating shaft 1, on the end face of the backboard 4, multiple axial board vents are uniformly distributed on the same circumference of a circle; as shown in the FIG. 9 (a), in this embodiment, there are 3 board vents 87, 88, 89 distributed on the backboard 4; as shown in 9 (b), the rotating shaft 1 in this embodiment is hollow for weight reduction. The lock nut 5 is matched with the screw thread on the other end of the rotating shaft 1 by locking the lock nut 5 to axially compact magnetic conductive rings 6, 7, rotor units 11, 12, 13, 14 and spacer rings 8, 9, 10 into a whole, wherein the magnetic conductive ring 6 abuts against the backboard 4.

Since the plane of the backboard 4 is perpendicular to the rotating shaft 1, it minimize the axial shaking during the rotating of each rotor units 11, 12, 13, 14 to reduce the air gaps meanwhile increase the air gap flux density; another important function of backboard 4 and lock nut 5 is to prevent each stator units 37, 38, 39 and spacer rings 8, 9, 10 from axial sliding on the rotating shaft 1; specifically, since the attractions of magnet of the rotor for both sides of the stator core are not completely balanced, the axial sliding is inevitable and must be prevented otherwise the rotor assembly (i.e. the sum of all the moving parts, including the rotor units, spacer rings, magnetic conductive rings, rotating shaft, bearings, and lock nut) would not be rotatable because the stator units and the rotor units would attract together. In order to further prevent the sliding, the outer rim of the rotating shaft 1 has a keyway 90, and accordingly magnetic conductive rings 6, 7, rotor units 11, 12, 13, 14 and spacer rings 8, 9, 10 also have their own keyways (not shown in the drawings) matched with the keyway 90 of the rotating shaft 1 by keys (not shown in the drawings). There are rotating shaft steps 91, 92 positioned on both ends of the rotating shaft 1 which respectively abut against the inner edge of bearings 2, 3 to prevent the axial sliding between rotating shaft 1 and bearings 2, 3. On the other hand, since the bearings 2, 3 would suffer some axial force, deep groove bearings 2, 3 need to be adopted.

Figure 2:
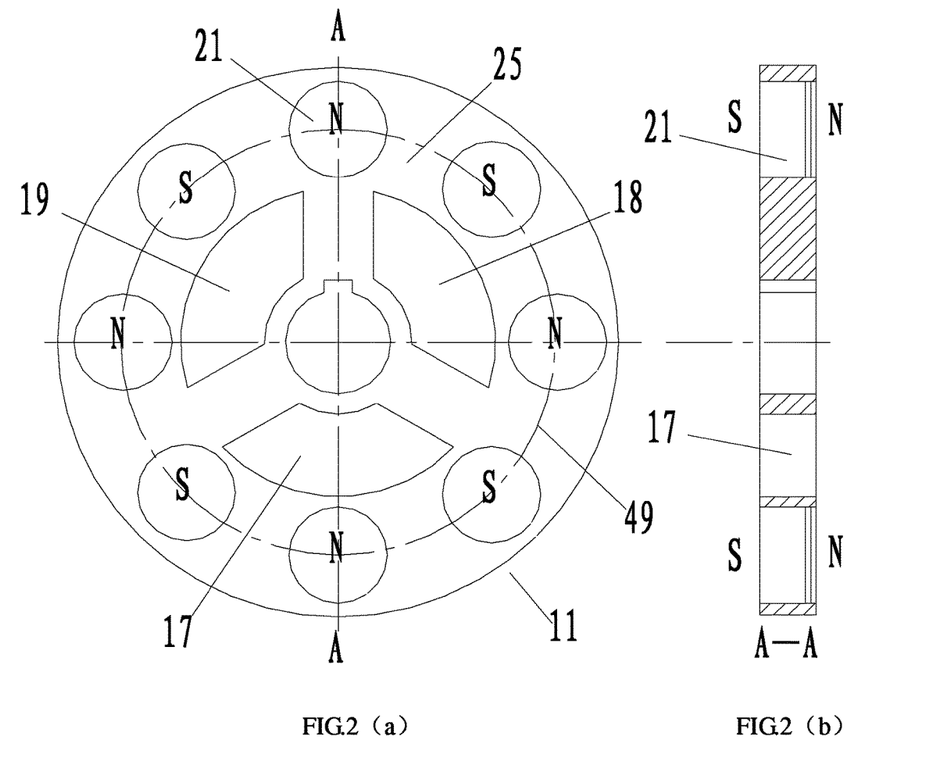

As shown in FIG. 2 (*a*), (*b*), taking the rotor unit 11 for example, each rotor unit comprises: the rotor disc 25 and 2p magnets which are embedded tightly in the rotor disc 25 and uniformly distributed in the pitch circle 49, wherein the insulating materials or high resistance materials with high mechanical strength and low density have been used as the materials of rotor disc 25 in which the magnets are embedded. For example, the epoxy board whose shape is like a disc with axle hole and keyway in the middle is used to fixedly connected to rotating shaft 1; 2p axial holes are arranged in its pitch circle 49, in which 2p magnets are embedded, wherein the magnetizing directions of the 2p magnets are parallel to rotating shaft 1 and the polarities of the 2p magnets are arranged alternately along the pitch circle 49; the respective magnets on each rotor units align with each other along the direction of rotating shaft 1, and the directions of the magnetic line of the aligned magnets are the same, p for natural number.

In this embodiment, taking 2p=8, the number of magnets on each rotor unit is eight, it means there are four pairs of rotor magnetic poles; as shown in the attached drawings as the magnet 21 of the rotor unit 11, the magnet 22 of the rotor unit 12, the magnet 23 of the rotor unit 13 and the magnet 24 of the rotor unit 14. The shape of the magnet may be cylindrical, polygon prismatic, elliptic cylindrical or fan-shaped cylindrical.

Since the magnets are embedded in the rotor disc, compared with the current existing technology in which the magnets adhere to both sides of the baseplate (for example, referring to the patent documents ZL871083191, ZL201110104458.8), the invention shortens the magnetic circuit, reduces the magnetic flux leakage, magnetic resistance and the volume of motor, and at the same time, the rotor baseplate under the current technology is either too thin to have sufficient strength or too thick and thus too heavy, while this invention has no problem like that. In addition, on the end face of each rotor disc 25, multiple axial rotor vents, as the rotor vents 17, 18, 19 shown in FIG. 2 (*a*), are uniformly distributed on the same circumference of a circle (located in the pitch circle 49) for heat dissipation and weight reduction.

Figure 1:
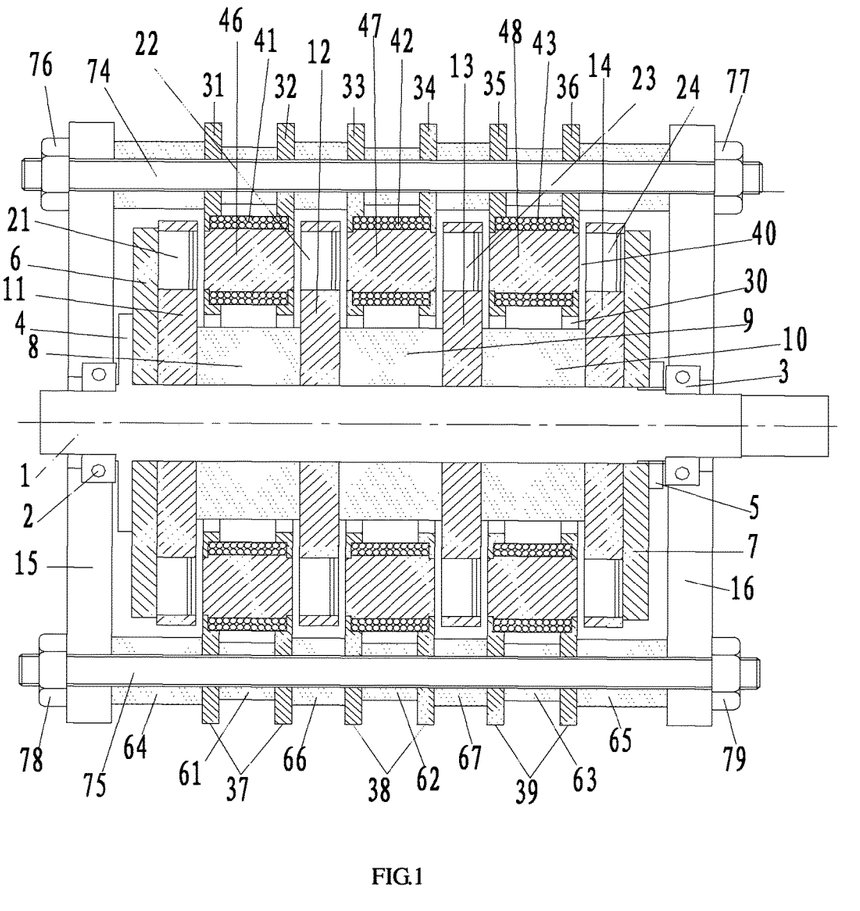
FIG. 1 is an axial section view of a permanent magnet laminated motor of the invention.
Figure 7:
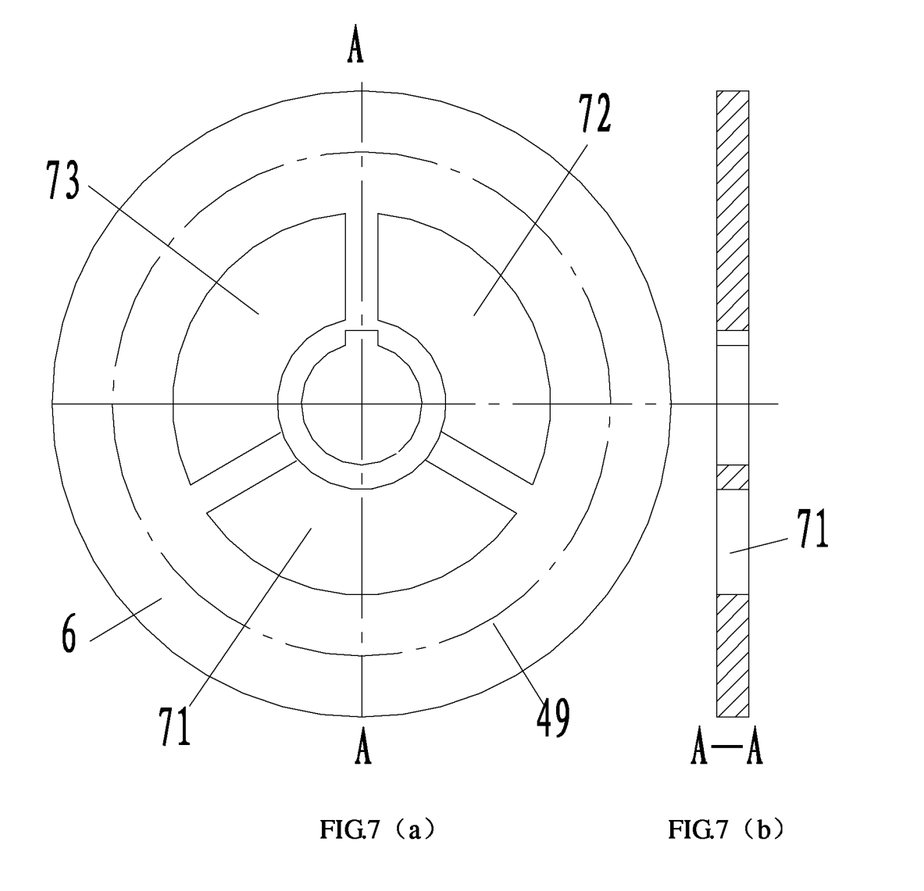

As shown in FIG. 1, magnetic conductive rings 6, 7 abut against the outer side of two rotor units 11, 14 respectively with axle hole and keyway in the middle to fixedly connected to rotating shaft 1, the diameter of magnetic conductive ring completely covering the magnets on the rotor unit shall prevail; because magnetic conductive rings 6, 7 with high permeability materials leads to the magnets attraction, the magnetic conductive rings 6, 7 will automatically cling to the rotor units 11, 14 on both ends. Magnetic conductive rings 6, 7 can produce a closed loop of low magnetic resistance by making the magnetic line travel between the adjacent two magnets through magnetic conductive rings. As a result, the magnetic resistance is mainly generated in the air gap 40 between stator unit and rotor unit so that the magnetic circuit is very short and the magnetic resistance is very tiny, that is to say, the magnetic lines pass through materials with low magnetic resistance except the air gap in the magnetic lines loop of the invention. Compared with the motors in current existing technology, in which magnetic lines return through air or stator resulting from lacking of magnetic conductive rings, the new invention significantly improves the magnetic flux density of the air gap (in the test of the prototype following the invention, the air gap magnetic flux density during the work is more than 1.2T which is a fairly high value). In addition, on the end faces of the magnetic conductive rings 6, 7, multiple axial magnetic conductive ring vents, as the magnetic conductive ring vents 71, 72, 73 shown in FIG. 7 (*a*), are uniformly distributed on the same circumference of a circle (located in the pitch circle 49) for heat dissipation and weight reduction.

Figure 6:
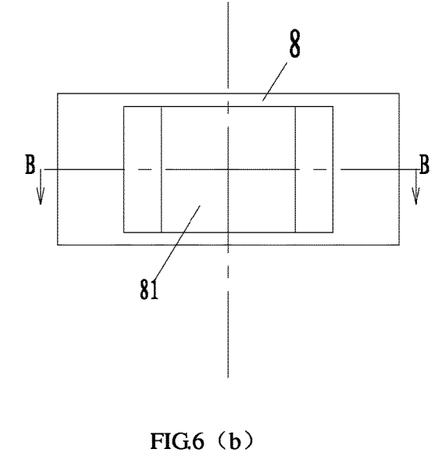

The spacer rings 8, 9, 10 adopts low density plastic or epoxy plate as their materials, and have shapes of a round pie with the axle hole and keyway in the middle to fixedly connect with the rotating shaft 1; the roles of the spacer rings 8, 9, 10 are to reserve a fixed space between adjacent two rotor units in order to insert the stator units 37, 38, 39; similarly, for ventilation and weight reduction, on the end face of the spacer ring (as shown in FIG. 6 (*a*)-(*d*) taking the spacer ring 8 for example), multiple spacer ring axial vents 84, 85, 86 are uniformly distributed on the same circumference of a circle, and multiple spacer ring radial vents 81, 82, 83 which connected with axial vents 84, 85, 86 are distributed on the outer rim of the spacer ring.

Figure 4:
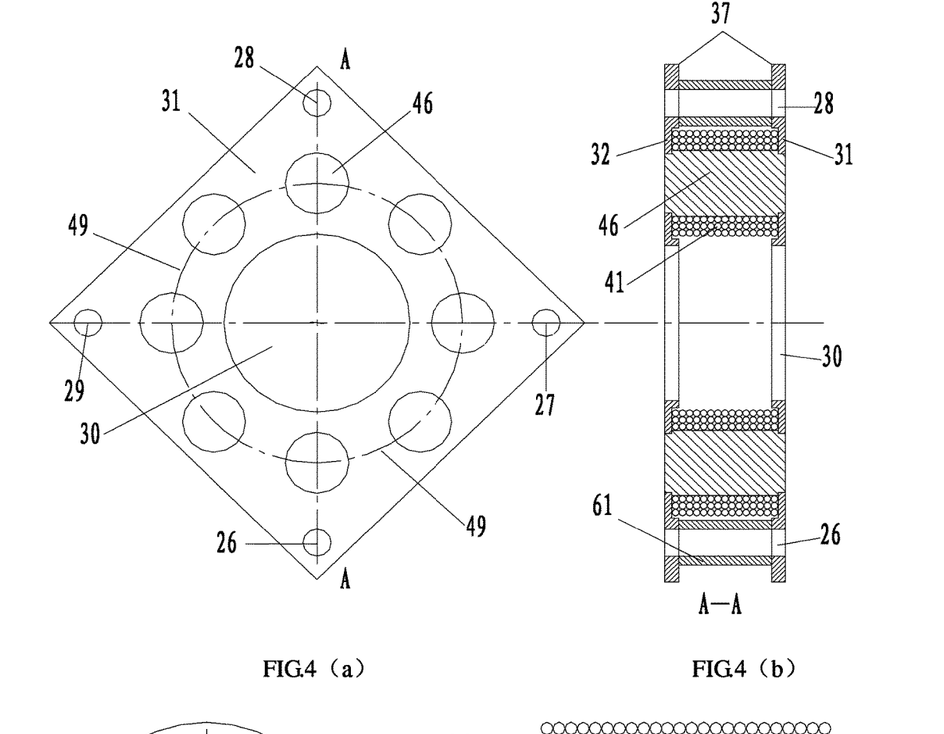

As shown in FIGS. 4 (*a*) and (*b*), each stator unit comprises: a stator frame consisting of a pair of stator baseplates arranged in parallel and mirroring each other (shown in the FIG. 1 as the stator baseplates 31, 32 of the stator unit 37, the stator baseplates 33, 34 of the stator unit 38, the stator baseplates 35, 36 of the stator unit 39), 2p cores clamping between the stator baseplates and distributed evenly on the pitch circle 49, and coils wound around the outer rim of each core, wherein p for natural number.

In this embodiment, taking 2p=8, the number of cores and coils in each stator unit and the number of magnets in each rotor unit are the same to be eight; as shown in the attached drawings as the core 46 and coil 41 of the stator unit 37, the core 47 and coil 42 of the stator unit 38, the core 48 and coil 43 of the stator unit 39.

The shape of each stator baseplate is a polygon with a circular hole 30 in the middle. The diameter of the circular hole 30 is slightly larger than the outside diameter of spacer rings 8, 9, 10, which ensures the spacer rings 8, 9, 10 not touching the stator frame during rotation. The axial thickness of stator units 37, 38, 39 is less than the axial thickness of spacer rings 8, 9, 10 (the axial thickness of spacer ring is equal to the sum of the axial thickness of the stator unit and two times the thickness of the air gap), so there is the air gap 40 between the stator unit and the adjacent rotor unit. The size of the air gap 40 shall prevail when rotor unit does not touch stator unit during the rotation. The magnets on the rotor unit correspond to the core. The axis of the core is parallel to the rotating shaft 1.

Figure 3:
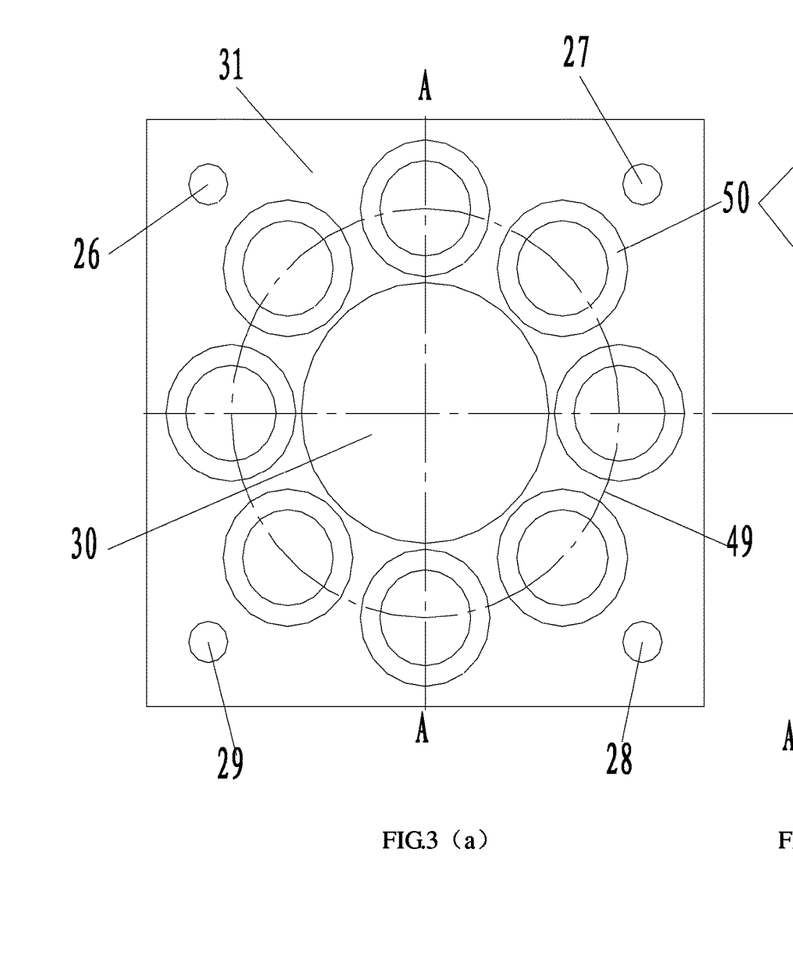

As shown in FIGS. 3 (a) and (b), in this embodiment, taking the stator baseplate 31 for example, the baseplate is a square structure, and the material of the baseplate is an insulator with higher mechanical strength or a material with high resistivity; on the surface of the stator baseplate 31, eight step holes 50 are uniformly distributed in the pitch circle 49 in order to insert core 46 and coil 41; baseplate mounting holes 26, 27, 28, 29 are arranged in the four corners of the stator baseplate 31 respectively. Four in-frame washers (as shown in the FIG. 1 as the in-frame washer 61 of the stator unit 37, the in-frame washer 62 of the stator unit 38, the in-frame washer 63 of the stator unit 39) are glued between a pair of stator baseplates of each stator unit concentrically to its mounting holes; therefore, the stator units can be fixed tightly by setting 4 installation screws (represented by screws 74, 75 shown in FIG. 1) through the baseplate mounting holes and the in-frame washers.

Figure 5:
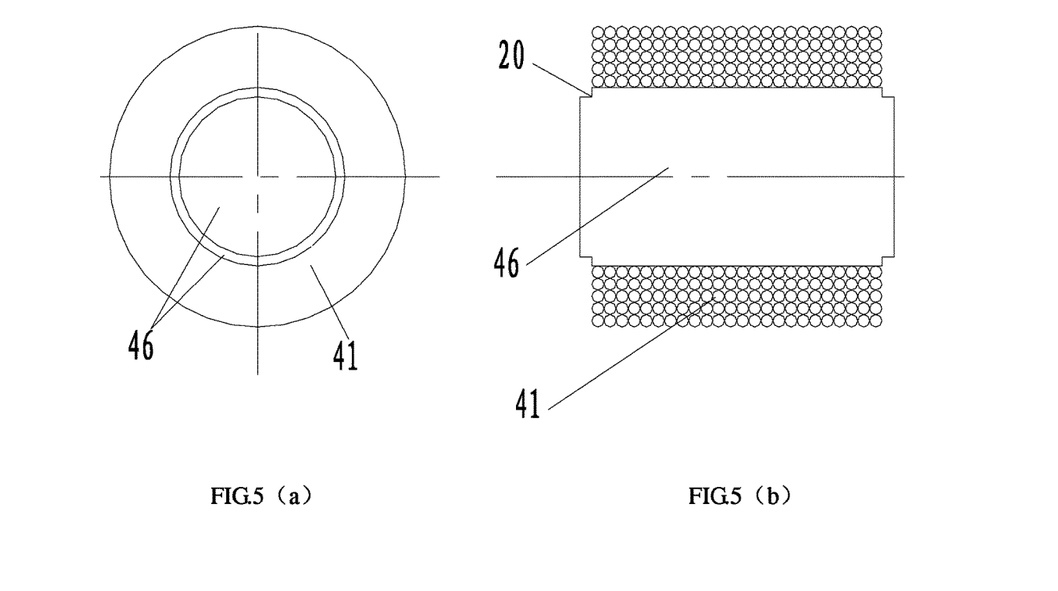

Since both ends of each core are close to the magnets, and the attraction of the magnets in both sides cannot be completely equal to each other, each core may suffer huge axial force easily leading to its axial movement which has to be prevented. To prevent the axial movement of the core, according to the embodiment as shown in FIG. 5 (a), (b), taking the core 46 and coil 41 for example, the outer rim of the core 46 is set to be a step surface 20, and the outer diameter at two ends of the core 46 is smaller than the one in the middle section, which is matched with the smaller internal diameter of the step hole 50 on the stator baseplate. The coil 41 is wound around the middle section of the core 46 with larger outer diameter, and the axial thicknesses of the coil 41 and the middle of core match with each other. The outside diameter of the coil 41 matches with the larger inner diameter of the step holes 50 on the stator baseplate to effectively prevent the axial movement of the core and provide enough axial stiffness for the stator frame.

In this embodiment, columnar silicon steel sheet cores are used as the cores 46, 47, 48, the utilization rate of these cores in the magnetic circuit is fairly high, that is, all the cores can participate in magnetic conducting. To minimize eddy current, the plane of the silicon steel sheet is parallel to the rotating shaft 1, namely, the normals of silicon steel sheet surface is perpendicular to the rotating shaft 1; additionally, in order to providing as large space as possible for winding, the coils 41, 42, 43 are directly wound around the cores 46, 47, 48, and the coils and the cores are only separated by a thin insulating layer (not shown in the drawings). Comparing with the current existing technology, in which the coils are wound in the radial coil slot of silicon steel sheet of the core, the coils and cores of the invention not only greatly improve the utilization rate of silicon steel sheet but also simplify the processing technology of silicon steel sheet and reduce the scrap rate of silicon steel sheet and the manufacturing cost; at the same time, using the stator frame consist of the stator baseplates instead of the traditional stator structure framework, results in reducing the motor weight and volume, and getting as much number of turns of the coil as possible to ensure the axial bending strength of the stator unit and to facilitate heat dissipation.

Since the electromotive force in each of the stator unit is generated in separate coil, it is different from general motors; in this embodiment, two ends of each coil are set as $A_g$ and $B_g$ ($g=1, 2, 3 \ldots 2p, 2p=8$), the way of series connection of each coil shows below:

A1-B1B2-A2A3-B3B4-A4A5-B5B6-A6A7-B7B8-A8

At this time, the electromotive force output from the end A1 to the end A8 is 2p times than that from single coil, i.e., the sum of electromotive force from eight coils, the whole internal resistance is also the sum of internal resistance from eight coils.

The stator units with structure described above can achieve the following four objects: having enough winding space; weight reduction; facilitating ventilation cooling; having enough axial bending strength.

Figure 10:
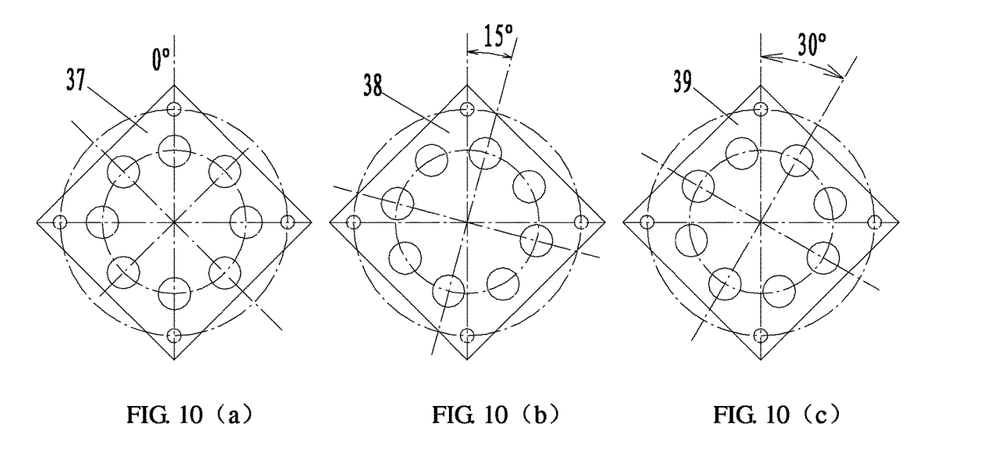

In this embodiment, three stator units 37, 38, 39 are used to form normal three-phase electricity which has a phrase difference of 120°. Specifically, in order to obtain three-phase electricity, the position of the step holes 50 of each stator unit 37, 38, 39 should be staggered one another (the position of mounting holes of each stator baseplate should not be staggered). As shown in FIG. 10, setting that the position of all the cores 46 on the stator unit 37 overlaps with the position of magnets of rotor units, that is the difference between these two positions on the pitch circle 49 is for 0°, then all the cores 47 on the stator unit 38 turn round for $(360°/2p)\times(1/n)=15°$ along the pitch circle 49, and all the cores 48 on the stator unit 39 turn round for $(360°/2p)\times(2/n)=30°$ along the pitch circle 49. It may also be that all the cores 47 on the stator unit 38 turn round for $(360°/p)\times(2/n)=30°$ along the pitch circle 49, and all the cores 48 on the stator unit 39 turn round for $(360°/p)\times(2/n)=60°$ along the pitch circle 49. These two methods above have the same effects: obtaining the ordinary three-phase electricity with phrase difference of 120°, and also greatly reducing the cogging torque during the startup of a motor so as to make it easier to start a motor.

Figure 8:
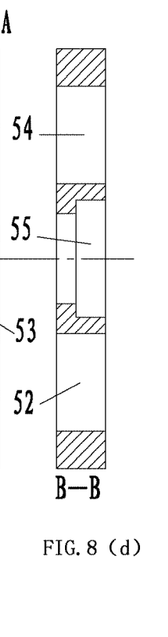

As shown in FIG. 8 (a)-(d), end plates 15, 16 are made of lightweight materials, and a bearing seat 55 is arranged in the center of end surface of each end plate for embedding bearings 2, 3, so that the rotating shaft 1 rotates in the bearing seats 55 of the end plates 15, 16; multiple axial end plate vents 51, 52, 53, 54, as shown in FIG. 8 (a), are uniformly distributed on the end plate 15, 16. End plate mounting holes 56, 57, 58, 59 are set in the four corners of the end plates 15, 16, whose positions are corresponding to the positions of baseplate mounting holes 26, 27, 28, 29 of the stator unit. Utilizing four installation screws (represented by installation screws 74, 75 shown in FIG. 1), eight long washers between stator units 37, 39 and end plates 15, 16 respectively (represented by long washers 64, 65 shown in FIG. 1), eight inter-frame washers among stator units 37, 38, 39 (represented by inter-frame washers 66, 67 shown in FIG. 1), and eight installation nuts (represented by installation nuts 76, 77, 78, 79 shown in FIG. 1), locks the stator assembly (i.e. the sum of all unmoving parts, including stator units, end plates, installation screws, in-frame washers, inter-frame washers and long washers) as a firm whole. The shape of motor is always polygon prismatic without a shell, which makes weight reduction compared with current existing cartridge-type motor with cylindrical shell.

When the rotor assembly rotating, air is inhaled from the end plate vents 51, 52, 53, 54 on the end plate 15 into the spacer ring 8, by flowing through the backboard vents 87, 88, 89 on the backboard 4 first, then the magnetic conductive ring vents 71, 72, 73 of the magnetic conductive ring 6, and finally the rotor vents 17, 18, 19 on the rotor unit 11. A part of the air flows out to cool the coil 41 and the core 46 along radial direction under the effect of centrifugal force of rotor units 11, 12 and spacer ring 8. Meanwhile another part of the air flows through the rotor vents on the rotor unit 12 and into the central spacer ring 9 to cool the coil 42 and the core 47. Similarly, the role of the air entered from the end plate 16 is to cool the coils 43, 42 and the cores 48, 47. Thus, the rotor assembly can form a centrifugal fan for cooling of itself so as to improve the specific power.

The locations of the cores on each stator unit described above are in a straight line parallel to the rotating shaft 1 along axial direction without staggered to obtain single phase electricity; but the cogging torque of this structure is a little bigger, so starting motors with this structure is not as convenient as starting a motor with stator units being staggered.

In addition, adjusting nuts can be used instead of long washers and in-frame washers so that the positions of stator units and the gaps between stator units and rotor units can be adjustable and furthermore the axial force of the rotor assembly may be almost zero.

The number of stator units in the present invention can be any number in addition to three, i.e., n=1, 2, 4, 5, 6 . . . , the number of rotor pole pairs can also be any number in addition to four, i.e., p=1, 2, 3, 5, 6, 7 . . . Other structures of the motor are the same as the embodiment 1.

To sum up, when the present invention is used as a generator, rotor units rotate to generate single phase or multi-phase alternating current (ac) in the coil of the stator units; when using as a motor, the multiple phase alternating current (ac) is led into the coil of the stator units, so that the rotor units rotate synchronizedly. The advantage of the motor in the invention is that having large power to weight ratio, small volume, compact bodies and the utilization rate of silicon steel sheet exceeds 95%. The power to weight ratio of general generator is 200 watts/kg, that of aviation generator can be up to 500 watts/kg, while the actual power to weight ratio of the motor in the present invention has been more than 800 watts/kg which not only saves copper and iron materials but also be particularly meaningful to land, sea and air transportation.

Some preferred embodiments of the present invention have been described above, which is not to be interpreted as limiting the scope of the invention. The foregoing embodiments of the invention include various modified forms. Therefore, all simple, equivalent changes and modifications according to the spirit of the appended claims and description, all fall within the scope asked for protecting by the claims of the present invention. Some conventional technical content is not described in details in the present invention.

What is claimed:

1. A permanent magnet laminated motor comprising:
a pair of end plates disposed in a parallel relationship to one another;
a rotating shaft rotatably disposed between said pair of end plates;
n+1 rotor units and n spacer rings fixably attached and sleeved orderly on the outer rim of said rotating shaft and axially compacted on said rotating shaft with said n+1 rotor units and said n spacer rings being alternating one another on said rotating shaft;
a pair of magnetic conductive rings sleeved on the outer rim of said rotating shaft and attached to the outer side of the outermost two of said n+1 rotor units respectively; and
n stator units respectively sleeved on the outer rims of said spacer rings correspondingly and defining an axial air gap between each of said n stator units and the adjacent rotor unit with said axial air gap being the same between each of said n stator units and the adjacent rotor unit and said n stator units being axially fixably attached to said pair of end plates by a plurality of installation screws;
wherein each of said n+1 rotor units includes:
a rotor disc defining 2p axial through-holes uniformly distributed in a pitch circle on an end plane of said rotor disc; and
2p magnets respectively embedded in said axial through-holes with the magnetizing directions of the 2p magnets being parallel to said rotating shaft and the polarities of said 2p magnets being arranged alternately along said pitch circle;
wherein the corresponding magnets among said n+1 rotor units are aligned to each other along the extension direction of said rotating shaft and the magnetic field lines of the aligned magnets have the same direction with n and p being natural numbers;
wherein an end of said rotating shaft includes a backboard perpendicular to and integrated with said rotating shaft and the outer rim of the other end of said rotating shaft including a screw thread and said magnetic conductive rings and said n+1 rotor units and said spacer rings and said backboard being axially compacted into a whole by a locknut;
a plurality of axial backboard vents being uniformly distributed on the same circumference of a circle on an end face of said backboard;
a plurality of axial rotor vents being uniformly distributed on the same circumference of a circle on an end face of said rotor disc;
a plurality of axial magnetic conductive ring vents being uniformly distributed on the same circumference of a circle on an end face of each of said magnetic conductive rings;
a plurality of axial spacer ring vents being uniformly distributed on the same circumference of a circle on an end face of each of said spacer rings, and a plurality of radial spacer ring vents interconnected with said axial spacer ring vents distributed on the outer rim of each of said spacer rings; and
a plurality of axial end plate vents being uniformly distributed on an end face of the end plate.

2. The permanent magnet laminated motor according to claim 1, wherein each of said n stator units includes
a stator frame including a pair of stator baseplates arranged in parallel and mirroring one other, and sleeved on the outer rims of said spacer rings;
2p cores clamped between said pair of stator baseplates and distributed evenly in said pitch circle; and
coils wound around the outer rim of each of said cores.

3. The permanent magnet laminated motor according to claim 2, wherein when taking n≥2, the positions of the 2p cores of each of said stator units are correspondingly staggered or aligned with the positions of the 2p cores of adjacent stator unit along axial direction.

4. The permanent magnet laminated motor according to claim 2, wherein the surface of said stator baseplate is provided with 2p step holes which are distributed evenly in said pitch circle for inserting said cores wound by said coils.

5. The permanent magnet laminated motor according to claim 4, wherein the outer rim of each of said cores is set to be a step surface, and the outer diameter at two ends of each of said cores is smaller than the outer diameter of a middle section of each of said cores and is matched with the smaller internal diameter of said step holes on said stator baseplate, and each of said coils is wound around the middle section of each of said cores, and the axial thickness of each of said coils is matched with the thickness of the middle section of each of said cores, and the outside diameter of each of said coils is matched with the larger inner diameter of said step holes on the stator baseplate.

6. The permanent magnet laminated motor according to claim 2 wherein each of said pair of stator plate has a plurality of baseplate mounting holes distributed on the edge of said stator baseplate for receiving said installation screws, and in-frame washers glued between said pair of stator baseplates of each of said n stator units and concentric to said baseplate mounting holes.

7. The permanent magnet laminated motor according to claim 6, wherein each of said end plate has a plurality of end plate mounting holes distributed on the edge of each of said end plates for receiving said installation screws, and a plurality of spacers disposed between each of said n stator units and each of said end plates and concentric to said end plate mounting holes.

8. The permanent magnet laminated motor according to claim 7, wherein when taking n≥2, said plurality of spacers is disposed between every two adjacent stator units and sleeved on the outer rims of said installation screws.

9. The permanent magnet laminated motor according to claim 1, wherein said magnets and said cores are of cylindrical shape, polygon prismatic shape, elliptic cylindrical shape or fan-shaped cylindrical shape.

* * * * *